(12) United States Patent
Wright et al.

(10) Patent No.: US 12,341,878 B2
(45) Date of Patent: Jun. 24, 2025

(54) GENERATING CRYPTOGRAPHIC SECURITY PARAMETERS RESPONSIVE TO CONDUCTIVE MESH-CAPTURED RADIANCES

(71) Applicant: HEWLETT PACKARD ENTERPRISE DEVELOPMENT LP, Spring, TX (US)

(72) Inventors: Joseph Wright, Spring, TX (US); Christopher J. Davenport, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 196 days.

(21) Appl. No.: 18/181,429

(22) Filed: Mar. 9, 2023

(65) Prior Publication Data

US 2024/0305452 A1   Sep. 12, 2024

(51) Int. Cl.
| H04L 9/08 | (2006.01) |
| H04L 9/32 | (2006.01) |
| H04W 12/041 | (2021.01) |
| H04W 12/122 | (2021.01) |

(52) U.S. Cl.
CPC ............ *H04L 9/085* (2013.01); *H04L 9/0869* (2013.01); *H04L 9/0877* (2013.01)

(58) Field of Classification Search
CPC ..... H04L 9/085; H04L 9/0869; H04L 9/0877; H04L 9/0866; H04L 9/3247; H04L 9/3278
See application file for complete search history.

(56) References Cited

U.S. PATENT DOCUMENTS

| 2010/0268877 | A1* | 10/2010 | Resch | ................. G06F 16/1844 |
| | | | | 711/170 |
| 2014/0272272 | A1* | 9/2014 | Spenko | ................... B29C 39/10 |
| | | | | 428/113 |
| 2019/0334730 | A1* | 10/2019 | Endress | ............. H04L 67/1042 |
| 2020/0235917 | A1 | 7/2020 | Davenport et al. | |
| 2021/0035924 | A1* | 2/2021 | Best | ........................ G06F 21/87 |

OTHER PUBLICATIONS

Immler, Vincent, et al.; B-TREPID: Batteryless Tamper-Resistant Envelope with a PUF and Integrity Detection; 978-1-5386-4731-8/18/$31.00 © 2018 IEEE; Jun. 14, 2018; pp. 49-56, 8 pp.

Obermaier, Johannes, et al.; "An Embedded Key Management System for PUF-based Security Enclosures"; 2018 7th Mediterranean Conference On Embedded Computing (MECO), Budva, Montenegro, 11-14, Jun. 2018; 6 pp.

Immler, Vincent, et al.; "Secure Physical Enclosures from Covers with Tamper-Resistance"; IACR Transactions on Cryptographic Hardware and Embedded Systems, ISSN 2569-2925, vol. 2019, No. 1, pp. 51-96, 46 pp.

* cited by examiner

*Primary Examiner* — Joseph P Hirl
*Assistant Examiner* — Aayush Aryal
(74) *Attorney, Agent, or Firm* — Trop, Pruner & Hu, P.C.

(57) ABSTRACT

A process includes providing a first signal to a first conductive mesh of a semiconductor package to provide a wireless transmission, and receiving, by a second conductive mesh of the semiconductor package, the wireless transmission to provide a second signal. The process includes determining a signature of the second signal and generating, by a cryptographic security parameter generator of the semiconductor package, a cryptographic security parameter based on the signature.

19 Claims, 9 Drawing Sheets

GENERATING CRYPTOGRAPHIC SECURITY PARAMETERS RESPONSIVE TO CONDUCTIVE MESH-CAPTURED RADIANCES

BACKGROUND

A computer platform may be subject to a security attack for such purposes as seeking access to information that is stored on the computer platform or harming components of the computer platform. A computer platform may have a number of security mechanisms to protect the computer platform against security attacks, detect security attacks and perform remedial actions if security attacks occur.

DETAILED DESCRIPTION

Figure 1:
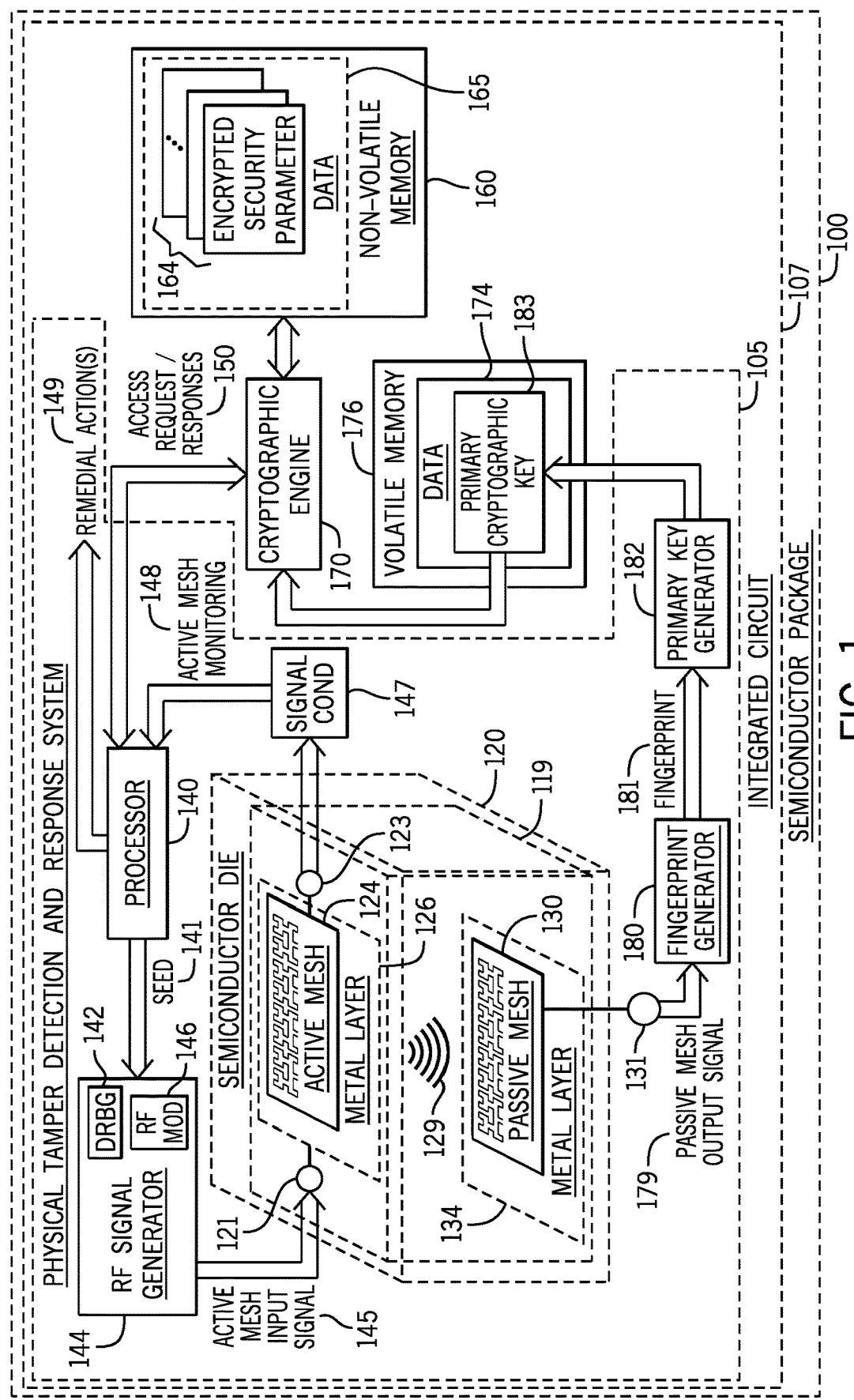
FIG. 1 is a schematic diagram of an integrated circuit (IC) having a physical tamper detection and response system that generates cryptographic keys responsive to conductive mesh-captured radiances according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

For purposes of preventing or at least inhibiting the degree of potential harm inflicted by security attacks, a computer platform may have a number of security mechanisms to prevent or at least inhibit security attacks. For example, a computer platform may have mechanisms to limit access to the computer platform, such as firewalls, passwords and keys. As another example, the computer platform may have a cryptographic security module, or security processor, which provides a number of security-related functions to harden the computer platform against security attacks. As an example of a security-related function, the security processor may provide a secure memory, or vault, to store cryptographic security parameters, or secrets. As other examples, the security processor may provide such security-related functions as generating cryptographic keys, sealing cryptographic keys to particular platform configuration register (PCR) states and unsealing cryptographic keys. The security processor may be part of a baseboard management controller of the computer platform. The security processor may be part of a trusted platform module (TPM) of the computer platform.

A computer platform may have or use one or multiple mechanisms to detect when a security attack occurs. For example, a computer platform may compare integrity measurements to reference measurements for purposes of determining when unauthorized modifications of an operating system kernel, firmware and/or applications have occurred.

As modern hardware root-of-trust technologies make it ever-increasingly difficult for attackers to gain access to computer platforms, nefarious individuals may seek to compromise computer platforms through physical tampering. In this context, "physical tampering" with a computer platform refers to one or multiple actions (corresponding to one or multiple "physical tampering events") being taken by an attacker having possession of the computer platform to gain access to or cause harm to a component or group of components of the computer platform. The physical tampering may occur after the computer platform is deployed in service, or the physical tampering may occur after the computer platform is manufactured but before the computer platform is deployed in service.

Physical tampering may involve performing an intrusive action on a semiconductor package (or "chip") of the computer platform. For example, a semiconductor package containing a computer platform's security processor may be the target of a physical tampering attack. The physical tampering may involve, for example, using a tool (e.g., a focused ion beam (FIB) or a laser) to precisely bore into the semiconductor package for such purposes as accessing a bus, register, memory, interface or other feature of the security processor. This access may allow information about the security processor or other security information (e.g., cryptographic security parameters stored therein) to be obtained. For example, bus communications may be monitored. As another example, register content or memory content may be sensed via probes. As another example, the access may be used to introduce glitches to cause the security processor to malfunction for purposes of bypassing security features (e.g., firmware validation).

A computer system's prompt detection of a physical tampering event enhances the computer platform's ability to apply effective remedial countermeasures that prevent or at least mitigate harm arising from the physical tampering. The remedial countermeasures may be local to a semiconductor package associated with a detected physical tampering event, may extend to the computer platform that contains the semiconductor package and/or may be more global in nature.

As an example of a remedial countermeasure that is local to a semiconductor package, cryptographic security parameters that are stored in the semiconductor package may be erased. As other examples of remedial countermeasures that are local to a semiconductor package, the semiconductor package may be reset, powered down or placed in a predefined locked down state.

As an example of a remedial countermeasure that is local to a computer platform that contains the semiconductor package, the computer platform may be powered down. As another example of a remedial countermeasure that is local to the computer platform, the computer platform may be reset. As another example, data that is stored in one or multiple memories or registers of the computer platform may be erased.

Remedial countermeasures may include one or multiple actions that extend beyond the computer platform. For example, a computer platform may provide one or multiple cloud services, and a remedial countermeasure may include quiescing operations of the computer platform related to providing the cloud service(s). As another example, a remedial countermeasure may include isolating, or quarantining, the computer platform from a cloud operator domain. As another example, a remedial countermeasure may include a computer platform notifying a remote management server about the detection of physical tampering. As another example, a remedial countermeasure may involve a computer platform sending an alert to a system administrator.

For purposes of detecting physical tampering with a semiconductor package, an integrated circuit (IC) of the semiconductor package may have a built-in active, conductive mesh, which is referred to as an "active mesh" herein. As an example, the active mesh may be a single conductive trace that is fabricated in a metal layer of the IC and has a serpentine routing pattern, or layout, which is analogous to a spider web. As an example, the conductive trace may have a random or pseudorandom routing pattern and span a region that covers the top of the IC. Here, the "top" of the IC refers to the portion of the IC that corresponds to the upper surface of the semiconductor package, i.e., the surface opposite from the bottom surface of the semiconductor package, which is closest to a circuit board substrate to which the semiconductor package is mounted. As another example, the active mesh's conductive trace may span a region that covers the bottom of the IC. As another example, an IC may have multiple active meshes, such as an upper active mesh that covers the top of the IC and a lower active mesh that covers a bottom of the IC.

A conductive mesh being "active" refers to the mesh being wired inside the IC to an energizing signal source, which, in turn, receives power from the IC's internal power supply infrastructure. In this manner, the IC's internal power supply infrastructure may provide an input signal (e.g., electrical pulses) to one end, or input terminal, of the active mesh's conductive trace for purposes of energizing the trace. The input signal propagates along the conductive trace from the input terminal to an output terminal (e.g., the trace's other end) of the conductive trace to produce a resulting output signal at the output terminal.

In the absence of physical tampering with the IC, the active mesh's output signal has an expected signature. For example, the output signal may be expected to be the same or nearly the same as the input signal. In this manner, the output signal may be expected to have a certain frequency content, analog waveform profile or digital representation, in the absence of physical tampering. The expected signature may take into account such factors as the input signal and the impedance of the active mesh. Physical tampering with a semiconductor package that contains such an active mesh may sever the active mesh's conductive trace or even without severing the active mesh, alter the impedance of the active mesh (e.g., a probe may contact the active mesh, changing the mesh's impedance). In either scenario, physical tampering may change an active mesh's output signal such that the output signal has a signature that differs from an expected signature, thereby alerting the IC to the physical tampering.

Because the active mesh is powered by the IC's internal power supply infrastructure, the active mesh is unenergized, or inactive, when the IC is powered down. Moreover, when the IC is powered down, the circuitry of the IC that detects unexpected signatures in the mesh's output signal is also powered down. Additionally, circuitry of the IC that initiates remedial countermeasures in response to physical tampering being detected is also powered down with the IC. Therefore, an IC that relies solely on an active mesh and associated circuitry for physical tampering detection may be unable to detect or respond to physical tampering attacks that occur when the IC is powered down.

Federal Information Processing Standards (FIPS) Publication No. 140-3, entitled "Security Requirements for Cryptographic Modules," sets forth that for Level 4 (the highest level) compliance, a cryptographic security module is to have a tamper response that operates when the cryptographic security module is powered down to zeroize plaintext security parameters. A "plaintext" security parameter refers to a parameter whose meaning is intelligible (whether by human or computer). Here, "zeroizing" plaintext cryptographic security parameters refers to rendering the plaintext security cryptographic security parameters unrecoverable, such as erasing the parameters, or for the case of where the cryptographic security module stores the parameters as encrypted data, erasing the corresponding cryptographic key. A cryptographic security module that solely relies on an active mesh for physical tampering detection may be incapable of zeroizing the module's plaintext secret cryptographic keys when the module is powered down.

In accordance with example implementations that are described herein, an IC, such as an IC that includes a cryptographic security module, or security processor, is constructed to zeroize the IC's cryptographic security parameters when physical tampering occurs with the IC, regardless of whether the physical tampering occurs when the IC is powered up or powered down. More specifically, in accordance with example implementations, an IC generates a cryptographic key when the IC is powered up, and the IC constrains storage of the cryptographic key to a volatile memory (e.g., a static random access memory (SRAM) or dynamic random access memory (DRAM)) of the IC and accordingly, does not, for example, store the key in a non-volatile memory (e.g., a flash memory) of the IC, which survives power loss). Accordingly, the cryptographic key disappears from the IC when the IC is powered down. The IC generates a cryptographic key on each power up in a way that does not rely on the storage of a seed for the key in a non-volatile memory of the IC, as the IC generates a seed (called a "fingerprint" herein) for the cryptographic key on each powerup. Therefore, in accordance with example implementations, on each power up, the IC generates a fingerprint and generates a cryptographic key based on the fingerprint. When the IC powers down, the fingerprint and the cryptographic key disappear, or are erased.

As described further herein, the IC is constructed to generate the fingerprint in a manner that is sensitive to any physical tampering with the IC such that the physical tampering alters, or permutes, the fingerprint and correspondingly, alters, or permutes, the cryptographic key that is generated therefrom. In accordance with example implementations, the IC's cryptographic security parameters are stored in encrypted form in a non-volatile memory of the IC. The encryption of the cryptographic security parameters is based on the cryptographic key, and the decryption of the cryptographic security parameters are based on the cryptographic key. Accordingly, physical tampering with the IC while the IC is powered down prevents recovery of the encrypted cryptographic security parameters, as the physical tampering causes the IC to generate a different cryptographic key on the next power up.

As described herein, the generation of the fingerprint is deterministic and repeatable, which means that if physical tampering does not occur, the IC generates the same cryptographic key on each power up. More specifically, in accordance with example implementations, the IC includes a passive conductive mesh (called a "passive mesh" herein) in addition to an active mesh to form a deterministic and repeatable cryptographic key generation system. The cryptographic key generation system is sensitive to physical tampering with the IC, such that if physical tampering occurs, the cryptographic key generation subsystem generates a different cryptographic key than the cryptographic key that was generated before the physical tampering occurred. In the context that is used herein, a conductive mesh is "passive" due to the conductive mesh not being wired to an energizing source. Instead, in accordance with example implementations, the passive mesh "floats" and serves as an antenna to receive radio frequency (RF) energy that energizes the passive mesh.

The passive mesh, similar to the active mesh, may be a single conductive trace that is fabricated in a metal layer of the IC (e.g., a metal layer other than the layer containing the active mesh), and the passive mesh may have a serpentine routing pattern, or layout, analogous to a spider web. Unlike the active mesh, one end of the passive mesh's conductive trace is unterminated to cause the passive mesh to float and function as an RF energy-sensing antenna. Accordingly, at its other end of the passive mesh's conductive trace, which may be considered the passive mesh's output terminal, the passive mesh provides an output signal that represents a radiance that is captured by the passive mesh. In this context, a "radiance" refers to electromagnetic energy that is sensed, or received, by the passive mesh.

More specifically, in accordance with example implementations, the IC energizes the active mesh (e.g., drives the active mesh with a modulated radio frequency (RF) signal) to cause the active mesh to produce radiate electromagnetic energy (also called "a wireless transmission" herein) that radiates, or wirelessly propagates from, the active mesh. In accordance with example implementations, the passive mesh is energized by the electromagnetic energy that radiates from the active mesh, which causes the passive mesh to provide an output signal. This output signal, in accordance with example implementations, represents a radiance that the passive mesh captures from the active mesh's wireless transmission. As described further herein, in accordance with example implementations, a fingerprint generator of the IC converts the passive mesh's output signal into a fingerprint, which represents a signature of the radiance that is captured by the passive mesh. The fingerprint, in accordance with example implementations, serves as a seed, which a cryptographic key generator of the IC uses to generate a primary cryptographic key.

In accordance with some implementations, the IC may apply the primary cryptographic key to a cryptographic cipher for purposes of encrypting plaintext cryptographic security parameters to produce encrypted security parameter data that is stored in a non-volatile memory of the IC. In accordance with further implementations, the IC may use the primary cryptographic key to generate one or multiple secondary cryptographic keys. In this manner, either the primary cryptographic key or a secondary cryptographic key may be used to encrypt plaintext cryptographic security parameters. In accordance with further implementations, the IC may generate a cryptographic security parameter other than a cryptographic key based on the fingerprint, as further described herein. In accordance with example implementations, the IC constrains the storage of data representing the fingerprint, the primary cryptographic key, and any secondary cryptographic keys derived therefrom to the IC's volatile memory such that when the IC is powered down, the data is removed, or erased. Physical tampering with the IC alters, or permutes, the IC's generation of the fingerprint and correspondingly, alters, or permutes, the IC's generation of the primary cryptographic key so that the physical tampering removes the IC's ability to generate a previously-generated fingerprint, a previously-generated primary cryptographic key or a previously-generated secondary cryptographic key derived from a previously-generated primary cryptographic key.

The conductive trace of the active mesh and/or the conductive trace of the passive mesh may, in accordance with example implementations, have a random or pseudo-random routing pattern. For example, the conductive trace may have a routing pattern that has abrupt ninety-degree turns, which produce signal reflections. As an example, in accordance with some implementations, the routing pattern may be a Hilbert curve path (also called a Hilbert spacing filling curve). A signal reflection is a signal loss phenomena in which a portion of an input signal is transmitted backwards causing, for RF communication systems, a slew of negative effects, such as distortion, attenuation, ringing, and standing waves. Accordingly, in RF communication systems, signal reflection-inducing routing patterns are avoided. However, in accordance with example implementations, the mesh's conductive trace has a routing pattern that is constructed to induce signal reflections. Although, due to the signal reflection-inducing path, a signal associated with the mesh (e.g., a signal propagating in the mesh or a signal provided by the mesh) may appear to be chaotic in nature, the signal is instead deterministic and repeatable. The signal reflection inducing features of the active mesh and/or passive mesh inhibit both emulating mesh signals, emulating mesh-produced wireless transmissions and deducing a fingerprint that is derived from the passive mesh's output signal.

Physical tampering may permute, or alter, one or more physical characteristics of the RF transmission and reception subsystem that produces the passive mesh's output signal. As an example, physical tampering may alter the effective length of the active mesh's conductive trace. As another example, physical tampering may alter the effective length of the passive mesh's conductive trace. As another example, physical tampering may alter the impedance of the active mesh's conductive trace. As another example, physical tampering may alter the impedance of the passive mesh's conductive trace. As another example, physical tampering may alter the impedance of the active mesh's and/or passive mesh's conductive trace. As another example, physical tampering may alter a mutual inductance between the active mesh and the passive mesh. As another example, physical tampering may introduce a change in the behavior of the propagation of the wireless transmission between the active mesh and the conductive mesh. As a more specific example, physical tampering may introduce a reflection, a refraction or a scattering of wireless transmissions between the active mesh and the passive mesh. The signal reflection-inducting routing pattern(s) of the active mesh and/or passive mesh make the fingerprint and key generation highly sensitive to any such physical changes.

Referring to FIG. 1, as a more specific example, an IC 107 may include one or multiple semiconductor die 120 that are disposed inside a semiconductor package 100 (or "chip"). In accordance with example implementations, the IC 107 may contain a non-volatile memory 160 that stores data 165 that represents encrypted cryptographic security parameters 164. In accordance with some implementations, the IC 107 may be or include a security processor that is part of a baseboard management controller or a trusted platform module (TPM).

In the context used herein, a "cryptographic security parameter" refers to information that is associated with a coding scheme (e.g., a cryptographic algorithm, or cipher) and whose exposure or modification can compromise the protection of an electronic system (e.g., a computer system or computer platform) and/or data stored in the electronic system from appropriation, harm and/or unauthorized use. In an example, a cryptographic security parameter may be a cryptographic key that is used by a cryptographic cipher to encode plaintext data, which has an intelligible meaning (whether by a computer or a human) into cryptographic text (or "ciphertext"), which does not have an intelligible meaning (whether by a computer or a human).

In another example, a cryptographic security parameter may be a cryptographic key that is used by a cryptographic cipher to decode ciphertext into plaintext data. In another example, a cryptographic security parameter may be a shared secret (e.g., a pre-shared secret or a secret generated by a key derivation function), such as a password or other value, which is possessed by components for purposes of protecting communications among the components. As another example, a cryptographic security parameter may be information, such as a seed or other input, which is processed (e.g., processed by a key derivation function) to derive one or multiple other cryptographic security parameters (e.g., cryptographic keys, seeds or secrets).

As another example, a cryptographic security parameter may be information that is derived by the application of a cryptographic security parameter to the information. For example, a cryptographic security parameter may be encrypted data, which is derived by encrypting plaintext data with a cryptographic key. As other examples, a cryptographic security parameter may be a digital certificate, a hash, a session key, a message key, a root key, a firmware image encryption key, a software image encryption key, a private signature key, an authentication key, a pseudorandom or a random key. As another example, a cryptographic security parameter may be a cryptographic key or encrypted data that is wrapped (e.g., encrypted by) a cryptographic key. As another example, a cryptographic security parameter may be a cryptographic key that is sealed to a particular state (e.g., a particular platform configuration register (PCR) state) of an electronic system.

In accordance with example implementations, the IC 107 includes a physical tamper detection and response system 105, which includes an RF transmission and reception subsystem 119. As depicted in FIG. 1, in accordance with some implementations, the RF transmission and reception subsystem 119 may be fabricated in a single semiconductor die 120 of the IC 107. The RF transmission and reception subsystem 119, in accordance with example implementations, includes an active mesh 124, and a passive mesh 130. The active mesh 124 may, as further described herein, be coupled to an RF signal generator 144 that energizes the active mesh 124, and the passive mesh 130 may be coupled to a fingerprint generator 180 that generates a fingerprint 181 based on a passive mesh output signal 179 that is provided by an output terminal 131 of the passive mesh 130.

In accordance with example implementations, when the IC 107 is powered up, the RF signal generator 144 provides a modulated RF signal, called an "active mesh input signal 145" herein, to an input terminal 121 of the active mesh 124 for purposes of energizing the active mesh 124. As described herein, in accordance with example implementations, the energization of the active mesh 124 serves dual purposes: the energization allows the IC 107 to perform active monitoring for physical tampering; and the energization allows the IC 107 to generate a cryptographic key (called a "primary cryptographic key 183" herein).

More specifically, in accordance with example implementations, the energization of the active mesh 124 produces an output signal at an output terminal 123 of the active mesh 124. This output signal is monitored by the physical tamper detection and response system 105 for purposes of actively detecting physical tampering with the IC 107 when the IC 107 is powered up. The energization of the active mesh 124 also causes the active mesh 124 to radiate RF energy to produce a wireless transmission 129. The wireless transmission 129, in turn, produces the passive mesh output signal 179 and results in the generation of the fingerprint 181 and primary cryptographic key 183.

Regarding the active mesh monitoring, in accordance with example implementations, when the IC 107 is powered on, a processor 140 (e.g., a processing core) of the physical tamper detection and response system 105 provides a seed 141 to the RF signal generator 144. In accordance with example implementations, the seed is an input to a deterministic random bit generator (DRBG) 142 of the RF signal generator 144. The DRBG 142, in response to the seed 141, produces a pseudorandom baseband signal, which an RF modulator 146 of the RF signal generator 144 uses to modulate an RF carrier signal to produce the active mesh input signal 145. In accordance with some implementations, the DRBG 142 may apply the seed 141 to a polynomial function to generate a sequence of bits, and the RF modulator 146 modulates the RF carrier signal with the sequence of bits to provide the active mesh input signal 145.

In accordance with some implementations, the DRBG 142 may have a design the same or similar to the design described in "Recommendation for Random Number Generation Using Deterministic Random Bit Generators," National Institute of Standards and Technology (NIST) Special Publication 800-90A Rev. 1 (June 2015). In accordance with further implementations, the DRBG 142 may be a pseudorandom bit generator that other than the generator that is described in NIST Special Publication 800-90A.

In accordance with example implementations, the processor 140 performs active mesh monitoring 148 for purposes of detecting whether physical tampering with the IC 107 has occurred. More specifically, in accordance with some implementations, the processor 140 monitors the output signal that is provided at the output terminal 123 of the active mesh 124 for purposes of comparing a signature of the output signal to an expected signature. If the output signal is inconsistent with the expected signature, then, in accordance with example implementations, the processor 140 may perform one or multiple remedial countermeasure actions 149 (or "remedial actions 149").

In accordance with some implementations, the physical tamper detection and response system 105 includes signal conditioning circuitry 147 that provides a digital stream to an input terminal of the processor 140, which represents the signal at the active mesh's output terminal 123. In accordance with some implementations, the signal conditioning circuitry 147 may include an analog-to-digital converter (ADC) and/or other signal conditioning components (e.g., one or multiple filters, one or multiple level detectors and/or an RF carrier demodulator). The processor 140 may, based on the digital stream, determine whether a signature of the digital stream matches an expected signature for the digital stream.

As an example, the expected signature of the digital stream may be a certain sequence of bits. As another example, the expected signature of the digital stream may be a particular frequency content or spectral content. As another example, the expected signature of the digital stream may be an expected set of statistics derived from the digital stream. As another example, the expected signature of the digital stream may be a particular digital representation.

In accordance with some implementations, the signal conditioning circuitry 147 may generate the digital stream based on the RF envelope of the active mesh's output signal. In accordance with further implementations, the signal conditioning circuitry 147 may contain a demodulator to demodulate the active mesh's output signal to produce an analog baseband signal, and an ADC of the signal conditioning circuitry 147 may convert the analog baseband signal to the digital stream that is provided to the processor 140.

Regardless of how the digital stream is generated and regardless of how the signature is determined, if the processor 140 detects that the signature of the digital stream does not match an expected signature, then the processor 140 may perform or at least initiate one or multiple remedial actions 149 to counter the detected physical tampering. For example, in accordance with some implementations, a remedial action 149 may include the processor 140 erasing the data 165 that is stored in a non-volatile memory 160 of the IC 107 (and correspondingly erasing the encrypted cryptographic security parameters 164). As another example, a remedial action 149 may include the processor 140 erasing data 174 stored in a volatile memory 176 of the IC 107, which represents the fingerprint 181. As another example, a remedial action 149 may include the processor 140 erasing the primary cryptographic key 183. As another example, a remedial action 149 may include the processor 140 initiating a power down of the IC 107 or semiconductor package 100. As another example, a remedial action 149 may include the processor 140 initiating a reset of the IC 107 or semiconductor package 100. As another example, a remedial action 149 may include the processor 140 generate an alert signal or an alert message on one or multiple external terminals of the semiconductor package 100.

Therefore, in accordance with example implementations, while the IC 107 is powered up, the physical tamper detection and response system 105 energizes the active mesh 124 and monitors the resulting output signal produced at the active mesh's output terminal 123 for purposes of detecting physical tampering with the IC 107. In accordance with example implementations, the physical tamper detection and response system 105 also relies on the energization of the active mesh 124 for the purpose of generating the primary cryptographic key 183. More specifically, in accordance with example implementations, the passive mesh 130 is an antenna that is formed from a single conductive trace that spans from a disconnected, or "floating," end to an opposite end of the trace, which serves the output terminal 131 of the passive mesh 130. The passive mesh 130 is constructed to sense, or capture, a radiance that is produced by the wireless RF transmission 129. The captured radiance is represented by the passive mesh output signal 179.

In accordance with example implementations, the fingerprint generator 180 converts the passive mesh signal 179 into a sequence of digital bits corresponding to the fingerprint 181. In general, the fingerprint 181 may be viewed as being a representation (e.g., a digital representation) of the signature of the passive mesh signal 179. The particular form of the fingerprint 181 may vary, depending on the particular implementation. As an example, the fingerprint may be digital bits that represent an RF envelope of the passive mesh signal 179. As another example, the fingerprint 181 may be digital bits that represent a spectral content of the passive mesh signal 179. As another example, the fingerprint 181 may be digital bits that represent a baseband signal produced by demodulating the passive mesh output signal 179.

In accordance with some implementations, the fingerprint 181 serves as a seed that a primary cryptographic key generator 182 of the physical tamper detection and response system 105 converts into the primary cryptographic key 183. The primary cryptographic key generator's generation of the primary cryptographic key 183 is deterministic and repeatable, meaning that a particular fingerprint 181 produces a specific corresponding primary cryptographic key 183, and a change to the fingerprint 181 causes the primary cryptographic key generator 182 to generate a different primary cryptographic key 183. In accordance with some implementations, physical tampering with the IC 107 changes one or multiple physical characteristics of the RF transmission and reception subsystem 119, which permutes, or changes, the fingerprint 181 and therefore, correspondingly changes, or permutes, the primary cryptographic key 183. In accordance with some implementations, the primary cryptographic key generator 182 may include a DRBG (or other deterministic pseudorandom number generator) to generate the primary cryptographic key 183 using the fingerprint 181 as a seed, or input, to the DRBG.

The IC 107 may use the primary cryptographic key 183 in many different ways, depending on the particular implementation. As depicted at 150, in accordance with example implementations, the processor 140 may submit access requests (e.g., write requests and read requests) to access the encrypted cryptographic security parameters 164. The encrypted security parameters 164 may be encrypted by the primary cryptographic key 183 or by a secondary cryptographic key that is derived therefrom. In accordance with example implementations, the processor 140 may perform the corresponding encryption and decryption based on the primary cryptographic key 183 (or key derived therefrom) to access the encrypted security parameters 164. In accordance with further example implementations, as depicted in FIG. 1, a cryptographic module, or engine 170, of the IC 107 may handle the encryption and decryption of data. For example, in response to a request to read an encrypted security parameter 164, the cryptographic engine 170 may read the corresponding encrypted cryptographic security parameter 164 from the non-volatile memory 160 and decrypt the encrypted security parameter 164 via the primary cryptographic key 183 (or key derived therefrom). As another example, the processor 140 may write a particular plaintext cryptographic security parameter to the non-volatile memory 160, and in response thereto, the cryptographic engine 170 may encrypt the plaintext cryptographic security parameter using the primary cryptographic key 183 (or key derived therefrom) to produce the corresponding encrypted cryptographic security parameter 164, and the cryptographic engine 170 may then store the encrypted cryptographic security parameter 164 in the non-volatile memory 160.

The fingerprint 181 may be used to generate cryptographic security parameters for the IC 107 other than cryptographic keys, in accordance with further implementations. For example, in accordance with further implementations, the IC 107 may include a cryptographic security parameter generator that uses the fingerprint 181 to generate a shared secret. Although a cryptographic key is an example of shared secret, a shared secret may serve other purposes. For example, a shared secret may be used by the IC 107 to decrypt a firmware update. As another example, the IC 107 may use a shared secret to wrap a cryptographic key. Some shared secrets may be between a manufacturer of a computer platform containing the IC 107 and the manufacturer. Other shared secrets may be between two hardware devices of the same type and software stack. An example of a system that may use the fingerprint 181 as an input to generate a shared secret may be found, for example, in U.S. Patent Application Publication No. 2020/0235917, entitled "Shared Secret Generation," and which published on Jul. 23, 2020. The shared secret may be generated in other ways, in accordance with further implementations.

For the following example implementations that are described herein, the cryptographic security parameter that is derived from the fingerprint 181 is the primary cryptographic key 183, although it is understood that cryptographic security parameters other than keys may be generated from fingerprints, in accordance with further implementations.

The primary cryptographic key generator 182 may generate the primary cryptographic key in response to any of a number of different events, depending on the particular implementation. For example, in accordance with some implementations, the primary cryptographic key generator 182 may generate the primary cryptographic key 183 in response to a reset or a power up of the integrated circuit 100. As another example, in accordance with further implementations, the primary cryptographic key generator 182 may generate the primary cryptographic key 183 in response to a particular access request to the non-volatile memory 160. As another example, in accordance with some implementations, the primary cryptographic key generator 182 may generate the primary cryptographic key 183 in response to an access request targeting a particular memory region or a particular group of encrypted cryptographic security parameters. As another example, in accordance with some implementations, the primary cryptographic key generator 182 may generate the primary cryptographic key 183 in connection with each access to the non-volatile memory 160 by the cryptographic engine 170.

Depending on the particular implementation, the RF signal generator 144 may perform any of a number of different types of carrier modulations for purposes of generating the active mesh input signal 145. As an example, in accordance with some implementations, the RF signal generator 144 may apply frequency modulation (FM) to the carrier signal based on the bitstream that is produced by the DRBG 142. As another example, the RF signal generator 144 may apply phase modulation (PM) to the bitstream that is provided by the DRBG 142. As another example, the RF signal generator 144 may perform pulse code modulation (PCM) to the carrier signal responsive to the bitstream that is provided by the DRBG 142. Moreover, in accordance with further implementations, the RF signal generator 144 may generate an active mesh input signal 145 using multiple RF carrier frequencies. For example, in accordance with some implementations, the RF signal generator 144 may perform a frequency sweep of multiple RF carrier frequencies.

Therefore, to summarize, in accordance with example implementations, the physical tamper detection and response system 105 performs active mesh monitoring 148, which involves, while the IC 107 is powered up, the processor 140 monitoring the output signal that is provided by the active mesh 124. In response to the active mesh monitoring 148 indicating a physical tampering event, the processor 140 may then perform or at least initiate one or multiple responsive actions. The physical tamper detection and response system 105 may further use the passive mesh 130 to generate a primary cryptographic key 183 that is used to encrypt and decrypt cryptographic security parameters that are stored in the non-volatile memory 160. If a physical tampering event occurs, regardless of whether the event occurs while the IC 107 is powered up or powered down, the event permutes the primary cryptographic key 183, thereby preventing the recovery of plaintext cryptographic security parameters.

In accordance with some implementations, the active mesh 124 may be formed in a particular metal layer 126 of the semiconductor die 120. In accordance with some implementations, the active mesh 124 includes a single conductive trace of the metal layer 126 that follows a path pursuant to a randomly-seeded space-filling algorithm, such as a Hilbert curves algorithm. It is noted that a Hilbert curves algorithm features ninety-degree turns. Such turns are avoided in RF spectrum design, as each abrupt ninety-degree turn induces a signal reflection, a signal-loss phenomena where a portion of the input signal is transmitted backwards, causing a number of negative effects, such as distortion, attenuation, ringing and standing waves. In accordance with example implementations, the metal layer 126 may be a layer near the top of the IC 107 (and at the top of the semiconductor package 100).

In accordance with example implementations, the passive mesh 130 may be fabricated in another metal layer 134 of the semiconductor die 120. As an example, the metal layer 134 may be below (relative to the top) of the metal layer 126 but similar to the active mesh 124. The passive mesh 130 may be formed from a single conductive trace of the metal layer 134 and may follow a path that follows a randomly-seeded space-feeling algorithm, such as the Hilbert curves algorithm. Depending on the particular implementation, the passive mesh 130 may be associated with a different Hilbert curve than the active mesh 124. Unlike the active mesh 124, in accordance with example implementations, the conductive trace of the passive mesh 130 is disconnected, or floating, at one end, which configures the passive mesh 130 to be a receiving antenna.

In accordance with some implementations, the fingerprint generator 180 may demodulate the signal received from the output terminal 131 of the passive mesh 130 and generate a fingerprint responsive to the demodulated signal. In accordance with some implementations, the demodulated signal may be an analog signal, and the fingerprint generator 180 may further include an ADC to convert the analog signal into a digital signal that represents the fingerprint. In accordance with further implementations, the fingerprint generator 180 may generate the fingerprint responsive to the passive mesh signal 179 without first demodulating the signal 179. As an example, the fingerprint generator 180 may include a circuit (e.g., an ADC) that generates a signal (e.g., a digital signal) in direct response to the passive mesh signal 179, as received from the passive mesh 130.

The active mesh 124 and the passive mesh 130 may be dedicated to their respective roles, in accordance with some implementations. However, in accordance with further implementations, the physical tamper detection and response system 105 may have one or multiple configurable meshes (e.g., meshes having respective random or pseudo-random routing patterns), where each configurable mesh may be configured to be either an active mesh or a passive mesh. As an example, the role of a configurable mesh may be configured before the IC containing the mesh enters production (e.g., a configuration bit defining the role of passive or active may have a value set by blowing a fuse or an anti-fuse). As another example, the physical tamper detection and response system 105 may have a configuration bit (e.g., a register bit) that may be controlled (e.g., set or cleared by a BMC) for purposes of configuring an associated configurable mesh to be either active or passive. The configurable mesh may have, for example, terminals at opposite ends of its conductive trace so that if the mesh is configured to be a passive mesh, one terminal is used, and if the mesh is configured to be an active mesh, both terminals are used.

Figure 2:
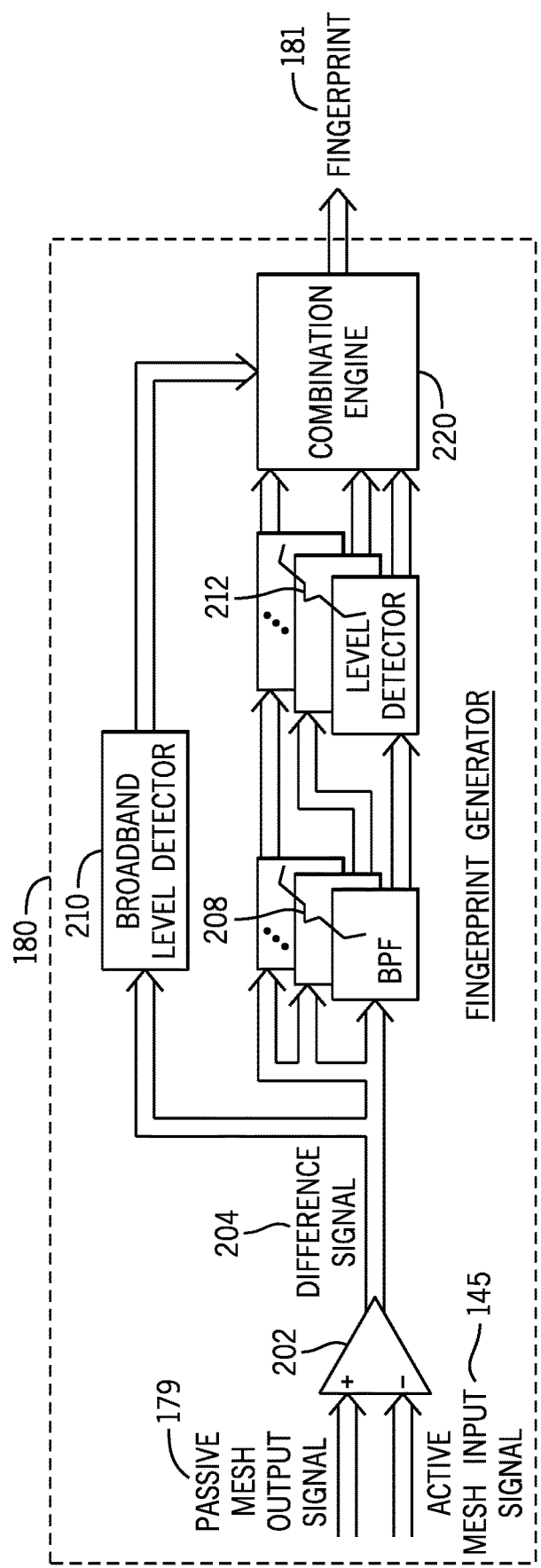
FIG. 2 is a block diagram of a fingerprint generator of FIG. 1 according to an example implementation.

Referring to FIG. 2, in accordance with some implementations, the fingerprint generator 180 may generate the fingerprint 181 based on the difference between the passive mesh output signal 179 and the active mesh input signal 145. More specifically, in accordance with some implementations, the fingerprint generator 180 may include a broadband amplifier 202 that receives the passive mesh output signal 179 (e.g., receives at an inverting input terminal) and the active mesh input signal 145 (e.g., receives at a non-inverting input terminal) for purpose of producing a difference signal 204.

The fingerprint generator 180 may then, in accordance with example implementations, generate the fingerprint 181 responsive to spectral content of the difference signal 204. More specifically, in accordance with some implementations, the fingerprint generator 180 may include bandpass filters (BPFs) 208 that are associated with different frequency bands. In this manner, in accordance with example implementations, each BPF 208 provides a signal that represents the spectral content of the difference signal 204 in the associated frequency band. As depicted in FIG. 2, in accordance with example implementations, the fingerprint generator 180 includes level detectors 212 that are associated with respective BPFs 208. The level detector 212, in accordance with example implementations, compares the signal that is provided by the associated BPF 208 to a threshold voltage corresponding to a spectral energy content threshold. In this way, if the spectral energy content of a particular frequency band exceeds the spectral energy content threshold, then the level detector 212 asserts (e.g., drives high) its output signal. Accordingly, the level detectors 212 collectively provide a digital signal representing a spectral content of the difference signal 204.

In accordance with some implementations, the fingerprint generator 180 may include a broadband level detector 210 that is constructed to sense a broadband spectral content level of the difference signal 204, compare this level to an broadband spectral energy level threshold and provide a signal representing whether the broadband spectral energy content of the difference signal 204 exceeds the threshold. A combiner engine 220 of the fingerprint generator 180 may then combine the digital bits provided by the level detectors 210 and 212 to provide the fingerprint 181. In accordance with some implementations, the combiner engine 220 may be an adder that assigns different weights to the outputs of the level detectors 210 and 212. In accordance with further implementations, the combiner engine 220 may be a register, whose bits correspond to the outputs of the level detectors 210 and 212.

Figure 3:
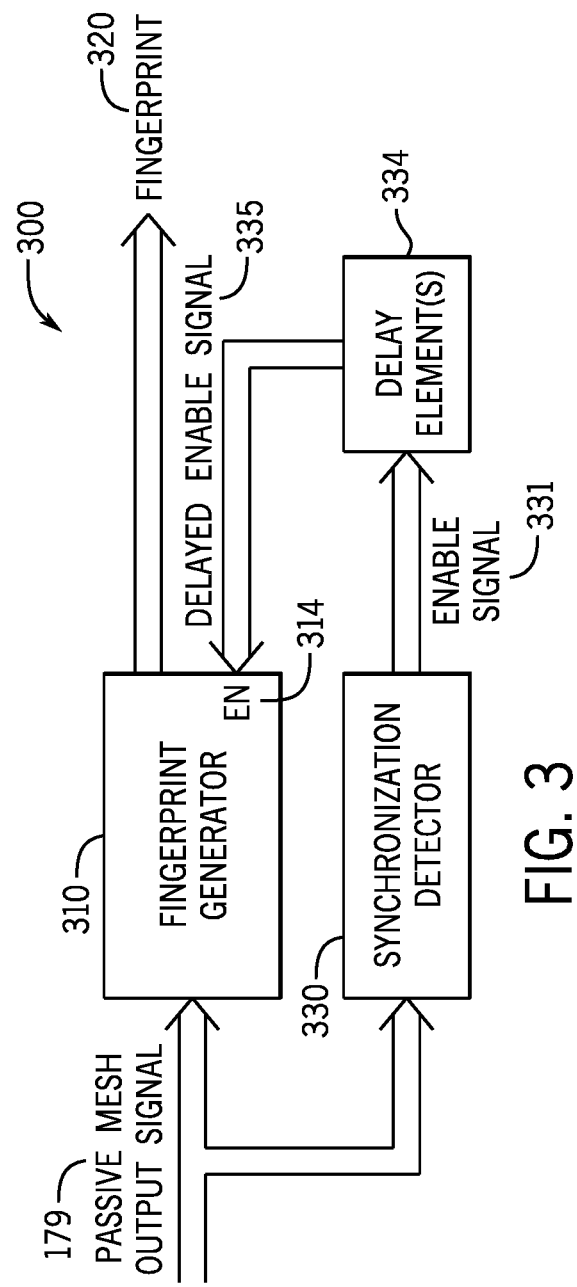
FIG. 3 is a block diagram of a fingerprint generation subsystem according to an example implementation.

In accordance with some implementations, due to the lengths of the conductive traces of the active mesh 124 and the passive mesh 130, the portion of the passive mesh's output signal that is used to form the fingerprint 181 may not correspond to the full length of the passive mesh's conductive trace and may not correspond to the full length of the active mesh's conductive trace. In accordance with example implementations, a fingerprint generation subsystem 300 of the physical tamper detection and response system 105, which is depicted in FIG. 3, may be used for purposes of generating the fingerprint 181 from a signal that traverses a longer portion, if not the entire length, of the conductive traces. More specifically, referring to FIG. 3, in accordance with example implementations, the fingerprint generation subsystem 300 includes a fingerprint generator 310 that receives the passive mesh input signal 179 from the passive mesh. The fingerprint generator 310 has an enable input 314 that controls when the fingerprint generator 310 is enabled to generate the fingerprint 181.

The fingerprint generation subsystem 300 includes a synchronization detector 330 that, in accordance with some implementations, receives the passive mesh output signal 179 and is triggered by a predefined delimiter of the passive mesh signal 179, which indicates the beginning of particular sequence for the passive mesh output signal 179. The delimiter may be introduced, for example, in the baseband signal that that is modulated to drive the active mesh. The synchronization detector 330, in accordance with example implementations, asserts (e.g., drives high) an enable signal 331 that is provided at an output terminal of the synchronization detector 330. As depicted in FIG. 3, the enable signal 313 may be delayed by one or multiple delay elements 334 of the fingerprint generation subsystem 300 to provide a delayed enable signal 335 at an output terminal of the delay element(s) 334. The delay enable signal 335, in turn, is provided to the enable input 314 of the fingerprint generator 310. In this way, the fingerprint generator 310 generates the fingerprint 181 from a selected later portion of the passive mesh output signal 179 that occurs a predefined amount of time (as set by the delay element(s) 334) after the predefined delimiter is detected.

Figure 4:
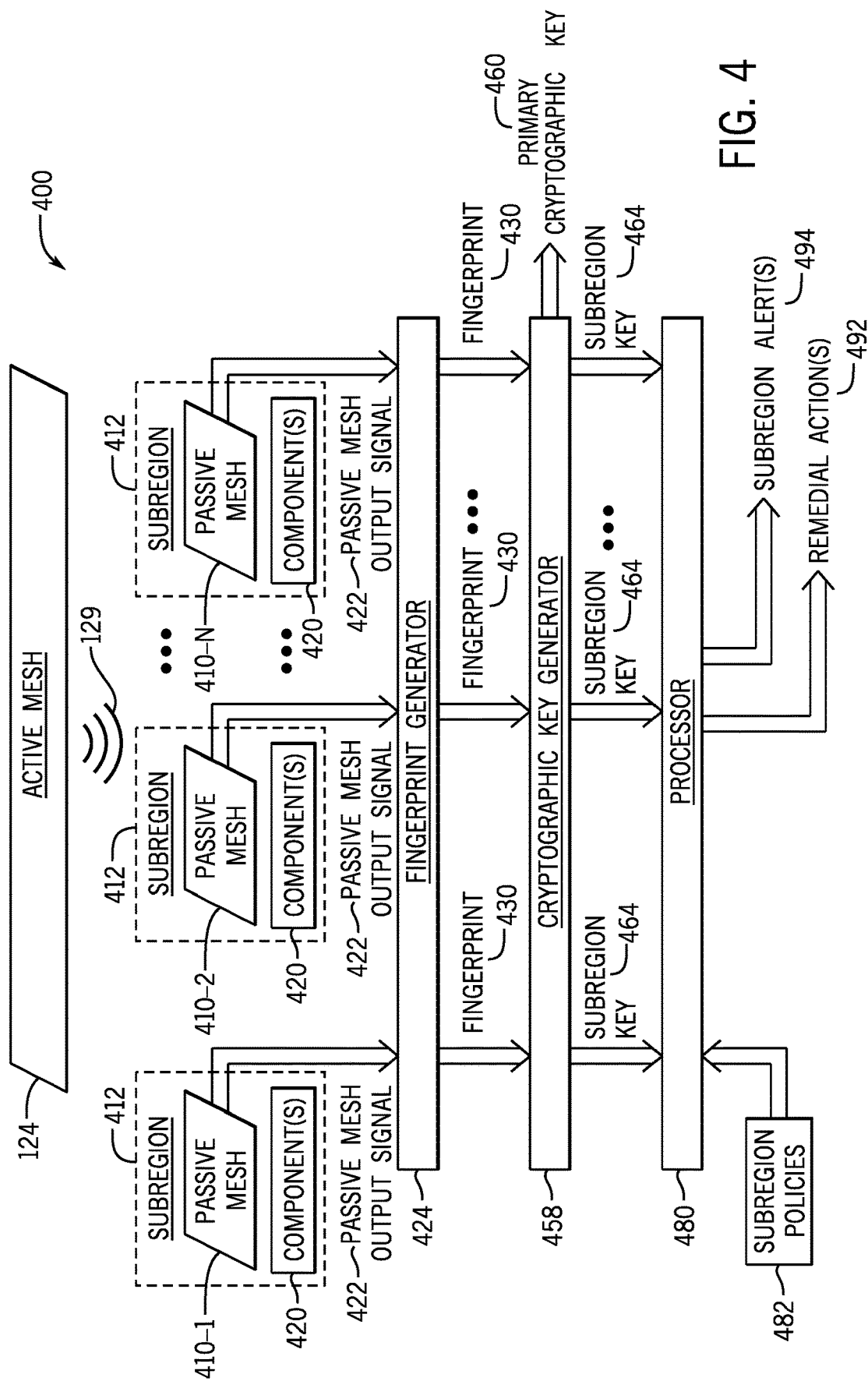
FIG. 4 is a block diagram of a physical tamper detection and response system having multiple passive meshes according to an example implementation.

Referring to FIG. 4, in accordance with further implementations, a physical tamper detection and response system 400 includes an active mesh 124 and multiple passive meshes 410 (N passive meshes $410_1$, $410_2$ and $410_N$ are illustrated in FIG. 4). In accordance with example implementations, each passive mesh 410 is covers an associated subregion 412. Each subregion 412, in turn, includes one or multiple components 420.

In accordance with example implementations, the components 420 may be relatively high priority components to be protected from physical tampering or may be associated with other security levels. As an example of a higher priority component 420, the component 420 may be a non-volatile memory that stores encrypted security parameters. As another example of a relatively high priority component 420, the component 420 may be a processing core, such as, for example, a processing core of a security processor. As another example, a particular higher priority component 420 may be a communication bus, such as, for example, a communication bus used to communicate data of a security processor or a communication bus used to communicate data representing plaintext or encrypted data corresponding to cryptographic security parameters. As another example, a particular component 420 may be a volatile memory that stores cryptographic keys and/or seeds. As another example, a relatively higher priority component 420 may be a cryptographic engine.

In this manner, in accordance with example implementations, each passive mesh 410 covers the die area(s) of the associated components 420 so that should a physical tampering event target one or multiple of the associated components, one or multiple physical properties of the corresponding passive mesh 410 are altered. In accordance with example implementations, the physical tamper detection and response system 400 includes a fingerprint generator 424 that receives passive mesh output signals 422 from the respective passive meshes 410. The fingerprint generator 424, in accordance with example implementations, may provide a corresponding fingerprint 430 for each corresponding passive mesh output signal 422. As such, each fingerprint 430, in accordance with example implementations, is sensitive to fingerprint permutations caused by physical tampering with the corresponding passive mesh 410. This allows a processor 480 of the physical tamper detection and response system 400 to detect when physical tampering with a particular subregion 412 (and correspondingly tampering with the component(s) 420 of the subregion 412) has occurred.

In accordance with example implementations, the physical tamper detection and response system 400 incudes a cryptographic key generator 458 that generates a subregion key 464 for each respective fingerprint 430. In this manner, in accordance with some implementations, the cryptographic key generator 458 may include a DRBG that deterministically generates the subregion key 464 using the fingerprint 430 as a seed. As such, in accordance with example implementations, each subregion key 464 is sensitive to the physical characteristics of the associated passive mesh 410, the active mesh 124 and the physical coupling between the active mesh 124 and the passive mesh 410. In accordance with example implementations, the processor 480 may monitor the subregion keys 464 for purposes of detecting when physical tampering with a particular subregion 412 has occurred. In accordance with some implementations, the processor 480 may instead monitor the passive mesh output signals 422 that are provided by the passive meshes 410 for purposes of detecting active tampering.

In accordance with some implementations, the cryptographic key generator 458 generates a primary cryptographic key 460. In accordance with some implementations, the cryptographic key generator 458 may generate the primary cryptographic key 460 based on a selected subset of the fingerprints 430. In manner, the generation of the primary cryptographic key 460 may rely on the fingerprint(s) 430 associated with the highest priority subregions 412. In accordance with further implementations, the cryptographic key generator 458 may generate the primary cryptographic key 460 based on all of the fingerprints 430. In accordance with some implementations, the cryptographic key generator 458 may generate the primary cryptographic key 460 based on a single fingerprint 430 (e.g., a fingerprint 430 associated with the highest or one of the highest priority subregions 412).

In accordance with some implementations, the processor 480 may determine whether a particular subregion key 464 has changed in any of a number of different ways. For example, in accordance with some implementations, the processor 480 may store, at a particular time, the subregion keys 464 in memory (e.g., a non-volatile memory) and regularly compare the subregion keys 464 to the stored subregion keys 464 to determine whether any of the subregion keys 464 have changed. As another example, in accordance with further implementations, the processor 480 may, at a particular time, encrypt a particular value with each of the subregion keys 464 and store the corresponding encrypted values in memory (e.g., non-volatile memory). Continuing the example, the processor 480 may then, from time to time, use the subregion keys 464 to decrypt the corresponding encrypted values to determine if the decryption produces the particular value, thereby identifying any changes.

The processor 480, in accordance with example implementations, may perform or at least initiate one or multiple responsive actions 492 responsive to the processor 480 detecting that one of the subregion keys 464 has changed. Moreover, as possibly part of the remedial action(s) 492, the processor 480 may generate a subregion alert responsive to detecting physical tampering with a particular subregion 412. In accordance with some implementations, the processor 480 may apply one or multiple subregion policies 482 for purposes of determining the remedial action(s) 492 that is initiated due to physical tampering with a particular subregion 412 being detected. For example, the subregion policies 482 may allocate relative priorities among the subregions 412 and set forth one or multiple remedial actions that occur when physical tampering occurs with a subregion 412 that has an associated priority. In this manner, in accordance with example implementations, the detection of physical tampering in a subregion 412 associated with a relatively high priority component 420 (e.g., a non-volatile memory that stores encrypted cryptographic security parameters, or a bus connected to such a non-volatile memory of a particular subregion 412), the subregion policy 482 may specify that the remedial action 492 is to zeroize cryptographic parameters. For other subregions 412 associated with relatively lower priority components 420, a particular subregion policy 482 may specify, for example, that the processor 480 log the detected physical tampering or send an alert to tampering with the particular subregion 412, without performing more drastic measures, such as zeroizing cryptographic security parameters.

Therefore, in accordance with example implementations, by using the passive meshes 410, the physical tamper detection and response system 400 may be used to detect a physical tamper event when the IC is powered on and moreover, identify the particular region and/or component(s) of the IC in which the physical tampering event has occurred.

Figure 5:
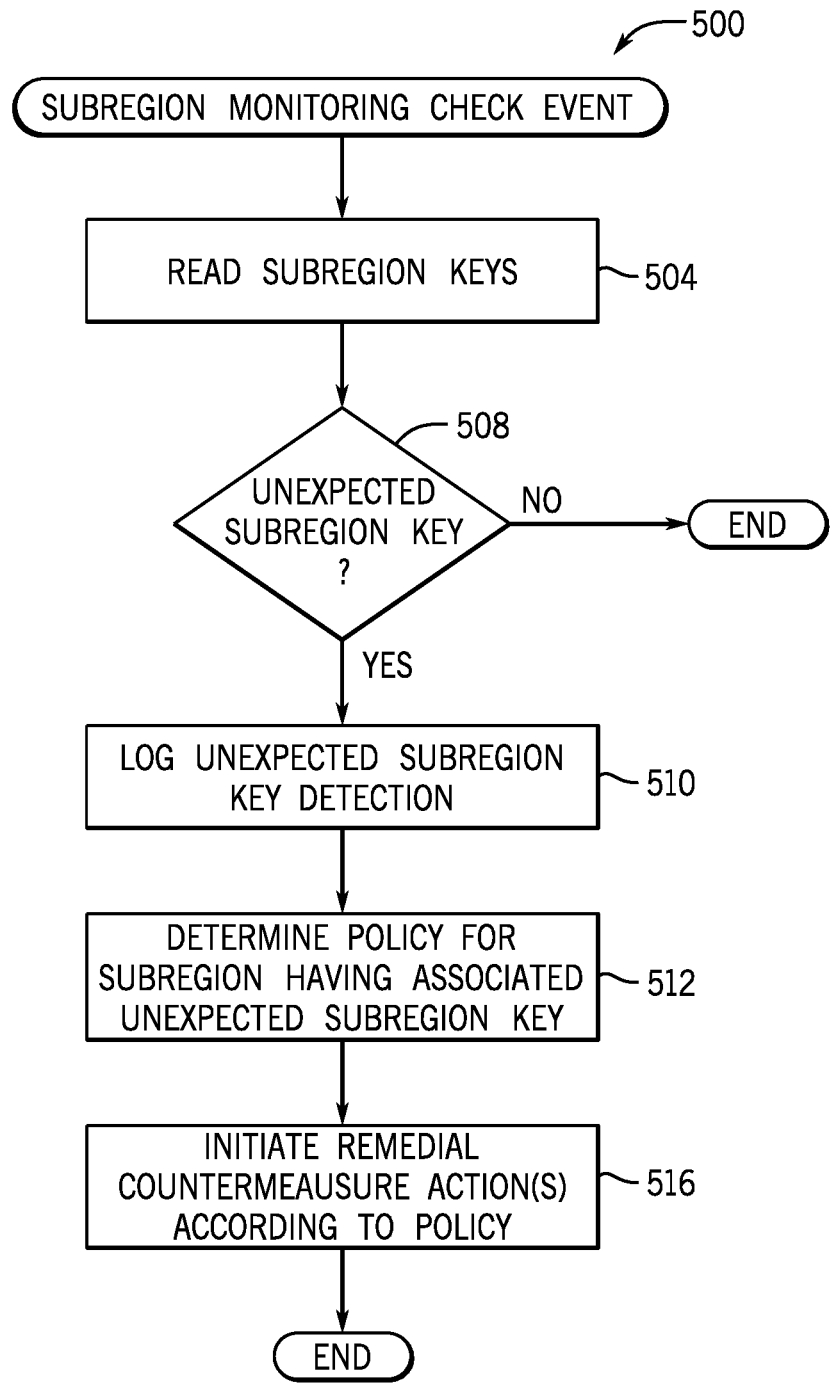
FIG. 5 is a flow diagram depicting a process to respond to detected physical tampering in a subregion of an IC corresponding to a passive mesh according to an example implementation.

FIG. 5 depicts an example process 500 that may be used to respond to a tampering event occurring with a particular passive mesh of multiple passive meshes according to an example implementation. As an example, the process 500 may be performed by the processor 480 of FIG. 4.

Referring to FIG. 5, in accordance with example implementations, the process 500 includes reading (block 504) subregion keys and determining (decision block 508) whether any of the subregion keys is unexpected. If not, then the process 500 includes continuing the reading (block 504) of the subregion keys and determining (decision block 508) whether any of the subregion keys are unexpected.

Otherwise, if, in decision block 508, a particular subregion key is unexpected, then, in accordance with example implementations, the process 500 includes logging (block 510) the unexpected subregion key detection and determining (block 512) a policy for the subregion key. In this manner, in accordance with some implementations, each subregion key and associated subregion of the IC may have a policy for responding to the detection of a physical tampering event with the subregion. For example, some memories of the IC may not store cryptographic security parameters and may be considered relatively low priority. As such, a detection of physical tampering with such a subregion may, for example, be associated with a policy that causes the processor to generate an alert (e.g., assert a signal, send a message, or other action) alerting a component and/or personnel to the physical tampering event detection. As another example, a policy associated with a particular relatively low priority subregion may cause the processor to initiate an orderly shut down of the IC. As another example, in accordance with some implementations, a policy associated with a relatively higher priority subregion (e.g., a non-volatile memory region that stores cryptographic security parameters) may cause the processor to immediately take actions to erase data corresponding to cryptographic security parameters. As another example, a policy associated with a relatively higher priority subregion may cause the processor to initiate an immediate shut down of the IC. Therefore, the process 500 includes initiating one or multiple responsive actions according to the policy, as set forth in block 516.

Figure 6:
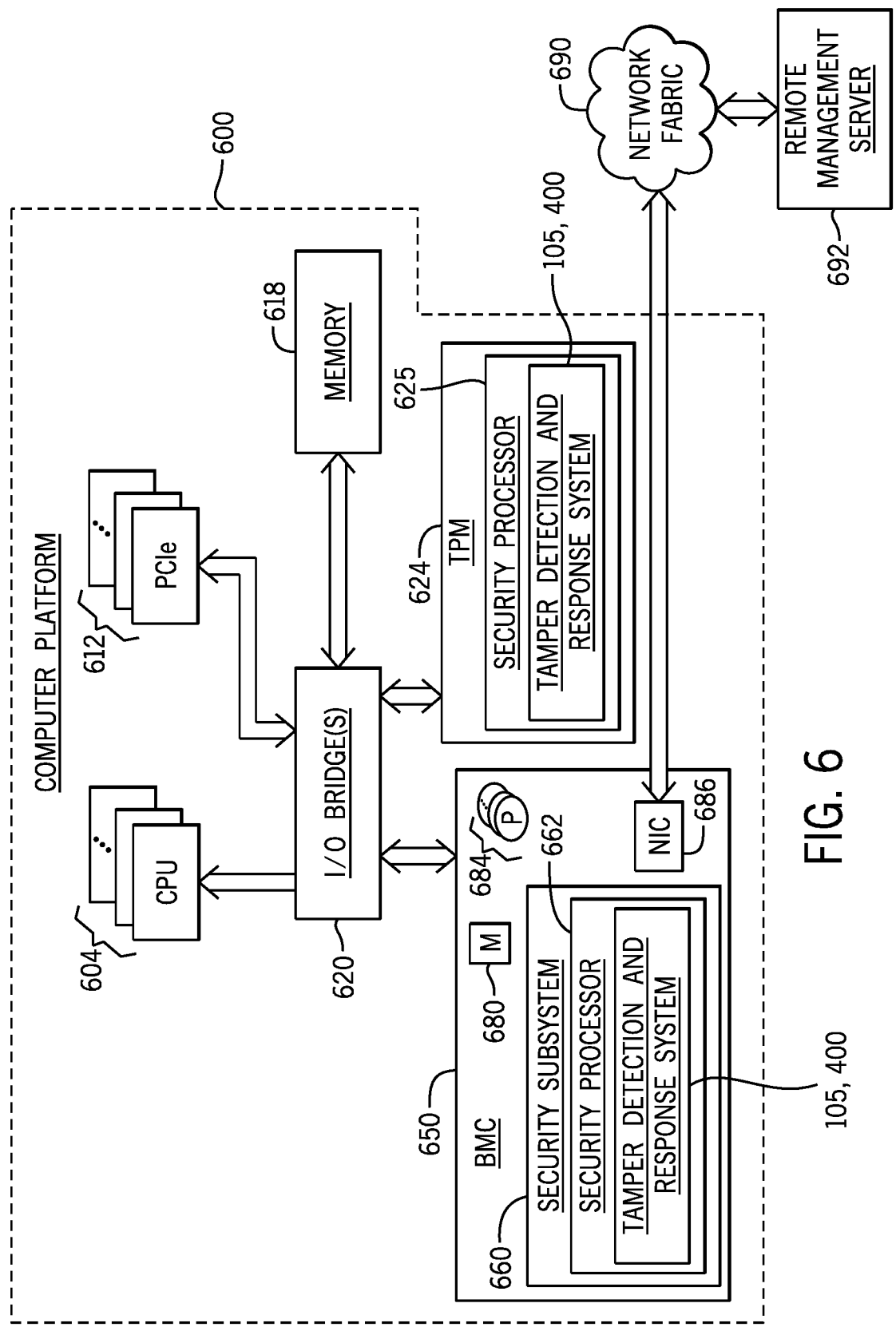
FIG. 6 is a block diagram of a computer platform having physical tamper detection and response systems that generate cryptographic keys responsive to conductive mesh-captured radiances according to an example implementation.

Referring to FIG. 6, in accordance with example implementations, a physical tamper detection and response system 105 (FIG. 1) or 400 (FIG. 4) may be used in a computer platform 600. For example, in accordance with some implementations, the computer platform 600 may include a baseboard management controller 650, which includes a security processor 662 and a physical tamper detection and response system 651 that protects the security processor 662.

As used herein, a baseboard management controller is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with some implementations, the baseboard management controller 650 provides a management plane and a security plane, which are isolated from each other. The baseboard management controller's firmware management stack executes in the management plane. The components in the baseboard management controller's security plane, in accordance with example implementations, are isolated by a fire wall, or a tightly-controlled communication barrier, from other components of the computer platform. As an example, in accordance with some implementations, communication through the communication barrier may be regulated through the use of a security services application programming interface (API).

More specifically, in accordance with example implementations, the baseboard management controller's security plane includes a security subsystem 660, and the security subsystem 660 includes a secure, non-volatile memory that may store encrypted data representing cryptographic security parameters for the computer platform 600. In accordance with example implementations, the physical tamper detection and response system 651 is part of the security subsystem 660. Moreover, in accordance with example implementations, the physical tamper detection and response system 651 may be similar to the physical tamper detection and response system 105 (FIG. 1) or 400 (FIG. 4).

In accordance with example implementations, the security subsystem 660 forms a security plane for the baseboard management controller 650. In addition to the security plane, the baseboard management controller 650, in accordance with example implementations, includes a management plane. In this manner, the baseboard management controller 650 may execute a set of firmware instructions, called a "firmware management stack," for purposes of executing the management stack, the baseboard management controller 650 may include one or multiple processing cores 684 and a memory 680 that may store machine-executable instructions representing the management stack. Moreover, in accordance with example implementations, the baseboard management controller 650 may include other components, such as, for example, a network interface controller (NIC) 686, which allows the baseboard management controller 650 to communicate, via network fabric 690, with a remote management server 692. The baseboard management controller 650 may also include, for example, bus interfaces to communicate with components of the computer platform 600. In accordance with some implementations, the baseboard management controller 650 may communicate with the remote management server 692 via a NIC of the platform 600 external to the baseboard management controller 650.

In general, the network fabric 690 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the computer platform 600 may include one or multiple CPU cores 604 (e.g., CPU processing cores, semiconductor containing CPU processor cores, and so forth), and memory devices that are connected to the CPU(s) 604 to form a system memory 618. The CPU cores 604 may execute machine-readable instructions to form a number of software and firmware components of the computer platform 600, such as a Unified Extensible Firmware Interface (UEFI), an operating system, one or multiple applications, and so forth. The CPU cores 604 may be coupled to one or multiple input/output (I/O) bridges 620, which allow communications between the CPU cores 604 and the baseboard management controller 650, as well as communications with various I/O devices, such as storage drives; one or multiple NICs; one or multiple Universal Serial Bus (USB) devices; I/O devices; a video controller; and so forth. Moreover, as also depicted in FIG. 6, the computer platform 600 may include one or multiple Peripheral Component Interconnect Express (PCIe) devices 612 (e.g., PCIe expansion cards) that may be coupled to the CPU cores 604 through corresponding individual PCIe bus(es). In accordance with a further example implementation, the PCIe device(s) 612 may be coupled to the I/O bridge(s) 620, instead of being coupled to the CPU cores 604. In accordance with yet further implementations, the I/O bridge(s) 620 and PCIe interfaces may be part of the CPU core 604.

In general, the memory devices that form the system memory 618, the memory 680, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with example implementations, the computer platform 600 may have a physical tamper detection and response system for different ICs other than an IC of the baseboard management controller 650 and/or physical tamper detection and response systems for one or multiple other ICs in addition to the baseboard management controller 650. For example, in accordance with some implementations, the computer platform 600 may have a trusted platform module (TPM) 624 that has a security processor 623 and a physical tamper detection and response system 625 to protect the security processor 623.

Figure 7:
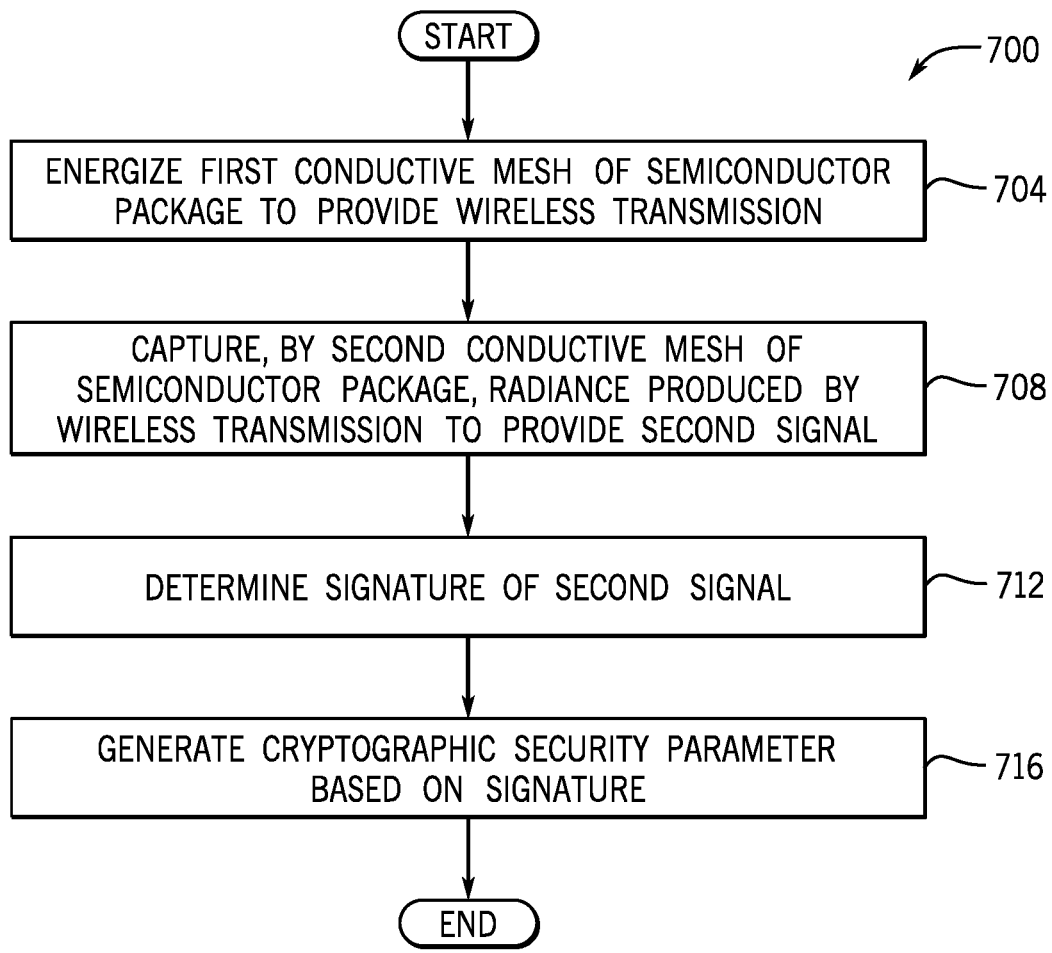
FIG. 7 is a flow diagram depicting a process to generate a cryptographic security parameter based on a radiance produced by a wireless transmission and captured by a mesh according to an example implementation.

Referring to FIG. 7, in accordance with example implementations, a process 700 includes energizing (block 704) a first conductive mesh of a semiconductor package to provide a wireless transmission. In accordance with some implementations, the first conductive mesh may be constructed to induce signal reflections. In accordance with some implementations, the first conductive mesh may have a random or pseudorandom routing pattern, such as a Hilbert curves algorithm. In accordance with some implementations, the first conductive mesh may be formed in a particular layer of a semiconductor die of the semiconductor package. Energizing the first conductive mesh may include providing a radio frequency (RF) modulated signal to the first conductive mesh. In accordance with some implementations, the first conductive mesh may be routed to cover an upper portion of the semiconductor package.

The process 700 includes capturing (block 708), by a second conductive mesh of the semiconductive package, a radiance that is produced by the wireless transmission to provide a second signal. In accordance with some implementations, the second conductive mesh may be constructed to induce signal reflections. In accordance with example implementations, the second conductive mesh may be randomly or pseudorandomly routed, such as, for example, have a Hilbert curve-based routing pattern. In accordance with some implementations, the second conductive mesh may be floating to form a passive receiver antenna to capture RF energy transmissions, including the radiance used by the wireless transmission from the second conductive mesh. In accordance with some implementations, the second conductive mesh may have a routing pattern that is different from the first conductive mesh.

The process 700 includes determining (block 712) a signature of the second signal and generating (block 716), by a cryptographic security parameter generator of the semiconductor package, a cryptographic security parameter based on the signature. In accordance with some implementations, the cryptographic security parameter may be a cryptographic key, and the cryptographic security parameter generator may be a key generator. In accordance with example implementations, the key generator may include a deterministic random bit generator, which generates the cryptographic key based on the second signal. In accordance with some implementations, the deterministic random bit generator may use a polynomial function. In accordance with some implementations, the second signal may represent a seed, which is used by the key generator to generate the cryptographic key. In accordance with some implementations, a permutation of at least one of the physical property (ies) of the first conductive mesh, the second conductive mesh or the wireless coupling there between may correspondingly permute the second signal, which causes a change in the cryptographic key generated by the key generator. In accordance with example implementations, generating the cryptographic key occurs responsive to a power up or reset of the semiconductor package. In accordance with some implementations, the cryptographic key is generated at predetermined times while the semiconductor package is powered up. In accordance with some implementations, the cryptographic key may be generated responsive to an access request to data that is encrypted by or is to be encrypted by the cryptographic key.

In accordance with some implementations, the cryptographic security parameter may be a cryptographic key, and a plaintext security parameter may be encrypted by the cryptographic key to provide encrypted data that is stored in a non-volatile memory of the semiconductor package. In accordance with some implementations, the cryptographic security parameter may be a cryptographic key, and a plaintext security parameter may be encrypted by the cryptographic key to provide encrypted data that is stored in a non-volatile memory of the semiconductor package. In accordance with some implementations, the cryptographic key may be stored in a volatile memory of the semiconductor package, such that powering down of the semiconductor package erases the cryptographic key. In accordance with some implementations, the second signal may represent a fingerprint, and the key generator may generate the cryptographic key based on the fingerprint. In accordance with some implementations, the fingerprint may be stored in a volatile memory of the semiconductor package, such that powering down of the semiconductor package erases the fingerprint.

Figure 8:
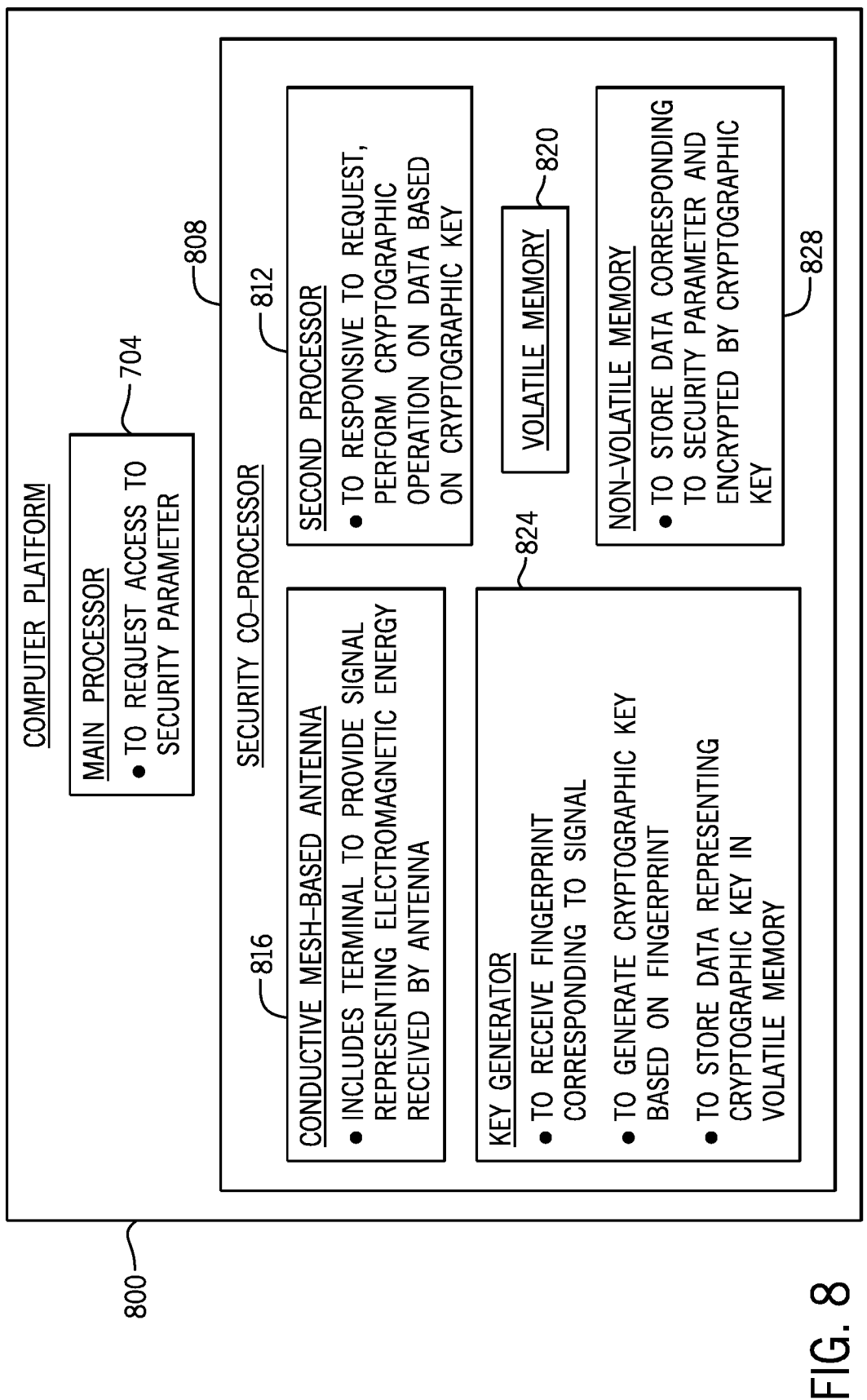
FIG. 8 is a block diagram of a computer platform having a key generator to generate a cryptographic key based on a fingerprint corresponding to electromagnetic energy received by a conductive mesh-based antenna according to an example implementation.

Referring to FIG. 8, in accordance with example implementations, a computer platform 800 includes a main processor 804 and a security co-processor 808 that is coupled to the main processor 804. The main processor 804 is to request access to a security parameter. As an example, the security parameter may be an encrypted plaintext cryptographic security parameter that is stored in a non-volatile memory of the second co-processor 808. The plaintext cryptographic security parameter may be a cryptographic key, a digital certificate, a hash, a session key, a message key, a root key, a firmware image encryption key, a software image encryption key, a private signature key, an authentication key, a pseudorandom key, a random key or another parameter.

The security co-processor 808 includes a conductive mesh-based antenna 816, a non-volatile memory 828, a volatile memory 820, a key generator 824 and a second processor 812. The conductive mesh-based antenna 816 includes a terminal to provide a signal that represents electromagnetic energy that is received by the antenna. In accordance with some implementations, the conductive mesh-based antenna may be constructed to induce signal reflections. In accordance with example implementations, the conductive mesh-based antenna may include a conductive trace that is randomly or pseudorandomly routed, such as, for example, have a Hilbert curve-based routing pattern. In accordance with some implementations, the conductive mesh-based antenna may capture RF energy transmissions.

In accordance with some implementations, the security co-processor 808 may include an active mesh that is energized to produce a wireless transmission, and conductive mesh-based antenna 816 may capture a radiance produced by the wireless transmission. In accordance with example implementations, the active mesh may have a conductive trace that has a routing pattern that is constructed to induce signal reflections. For example, the conductive trace may be randomly or pseudorandomly routed. In accordance with some implementations, the conductive trace may have a Hilbert curve-based routing pattern. In accordance with example implementations, the conductive trace may be formed in a metal layer of an integrated circuit. In accordance with some implementations, the security co-processor 808 may monitor the signature of an output signal that is provided by the active mesh for purposes of detecting physical tampering.

The non-volatile memory 828 is to store data that corresponds to a security parameter and is encrypted by a cryptographic key. The key generator 824 is to receive a fingerprint that corresponds to the signal, generate the cryptographic key based on the fingerprint and store data representing the cryptographic key in the volatile memory 820. The second processor 812 is to, responsive to the request, perform a cryptographic operation of the data stored in the non-volatile memory based on the cryptographic key. In accordance with example implementations, the second processor 812 may be a cryptographic engine. In accordance with some implementations, the request may be a write request, and the second processor 812, responsive to the write request, may encrypt a plaintext security parameter to store encrypted data in the non-volatile memory 828. In accordance with some implementations, the request may be a read request, and the second processor 812, responsive to the read request, may decrypt the data that is stored in the non-volatile memory to provide a plaintext security parameter.

Figure 9:
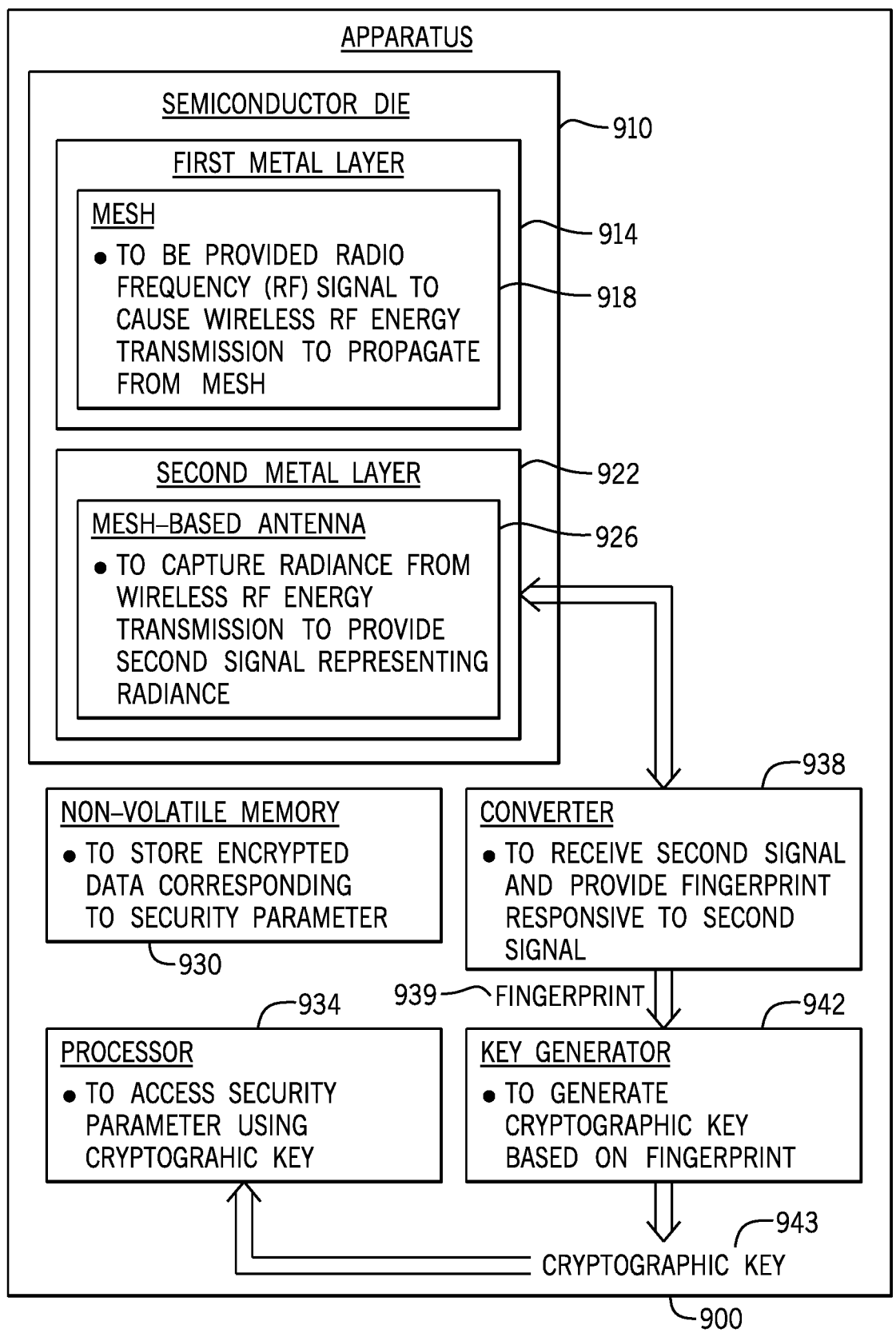
FIG. 9 is a block diagram of an apparatus to generate a cryptographic key based on a fingerprint derived from radiance captured by a mesh according to an example implementation.

Referring to FIG. 9, in accordance with example implementations, an apparatus 900 includes a semiconductor die 910, a non-volatile memory 930, a processor 934, a converter 938 and a key generator 942. The semiconductor die 910 includes a first metal layer 914 and a second metal layer 922. The first metal layer 914 includes a mesh 918, and a first radio frequency (RF) signal is to be provided to the mesh 918 to cause a wireless RF energy transmission to propagate from the mesh. The second metal layer 922 includes a mesh-based antenna 926 to capture a radiance from the wireless RF energy transmission to provide a second signal that is responsive to the RF energy. The non-volatile memory 930 is to store encrypted data that corresponds to a security parameter, and the processor 934 is to access the encrypted data using a cryptographic key 943. The converter 938 is coupled to the mesh-based antenna 926 to receive the second signal and provide a fingerprint 939 responsive to the second signal. The key generator 942 is to generate the cryptographic key 943 based on the fingerprint 939.

In accordance with example implementations, the mesh 918 and the mesh-based antenna 926 may have respective conductive traces that have routing patterns that are constructed to induce signal reflections. In accordance with some implementations, the apparatus 900 may include a processor to monitor an output signal that is provided at an output terminal of the mesh 918 for purposes of detecting physical tampering with the semiconductor die 910 while the die 910 is powered on.

In accordance with example implementations, the key generator 942 may include a deterministic random bit generator, which generates the cryptographic key based on the fingerprint. In accordance with some implementations, the deterministic random bit generator may use a polynomial function to generate the fingerprint. In accordance with example implementations, the key generator 942 generates the cryptographic key occurs responsive to a power up or reset of the semiconductor die 910. In accordance with some implementations, the key generator 942 generates the cryptographic key at predetermined times while the semiconductor die 910 is powered up. In accordance with some implementations, the key generator 942 generates the cryptographic key responsive to an access request to data that is encrypted by or is to be encrypted by the cryptographic key.

In accordance with further example implementations, at least one of a first conductive mesh or the second conductive mesh includes a conductive trace that is routed in a pattern to induce signal reflections. A particular advantage is that the generation of the cryptographic security parameter may be highly sensitive to permutations caused by physical tampering.

In accordance with some implementations, the pattern includes a Hilbert curve-based pattern. A particular advantage is that the generation of the cryptographic security parameter may be highly sensitive to permutations caused by physical tampering.

In accordance with some implementations, energizing the first conductive mesh includes providing the first signal to a first terminal of the first conductive mesh. The process further includes receiving a third signal that is received from a second terminal of the first conductive mesh, and responsive to the third signal, detecting physical tampering with the semiconductor package. The process includes performing a responsive action responsive to the detection of the physical tampering. A particular advantage is that active mesh monitoring for physical tampering detection may also be performed while the semiconductor package is powered on.

In accordance with example implementations, the cryptographic security parameter is generated responsive to a power up or a reset of the semiconductor package. A particular advantage is that the physical tampering while the semiconductor package is powered down zeroizes plaintext cryptographic security parameter.

In accordance with example implementations, the second conductive mesh is one of a plurality of separate conductive meshes. The process further includes, for each mesh, capturing, by the mesh, a radiance from the wireless transmission to provide corresponding signals. The corresponding signals include the second signal. Generating the cryptographic key further includes generating the cryptographic key based on the corresponding signals. Particular advantages include providing the ability to location the specific component(s) associated with physical tampering activity and the tailoring of remedial countermeasure(s) based on policies associated with the component(s).

In accordance with example implementations, the plurality of separate conductive meshes are spatially co-located at different locations in the semiconductor package corresponding to different components of the semiconductor package. Particular advantages include providing the ability to location the specific component(s) associated with physical tampering activity and the tailoring of remedial countermeasure(s) based on policies associated with the component(s).

In accordance with example implementations, the second conductive mesh is one of a plurality of separate conductive meshes. The process further includes, for each mesh of the plurality of separate conductive meshes, capturing, by the mesh, a radiance from the wireless transmission to provide corresponding signals. The corresponding signals include the second signal. The process further includes generating a first fingerprint for each corresponding signal of the corresponding signals; comparing the first fingerprints to respective expected second fingerprints; and detecting tampering with the semiconductor package based on the comparison. Particular advantages include providing the ability to location the specific component(s) associated with physical tampering activity and the tailoring of remedial countermeasure(s) based on policies associated with the component(s).

In accordance with example implementations, the process further includes performing a responsive action responsive to the detection of the tampering. A particular advantage is that potential harm due to the tampering may be prevented or at least mitigated.

In accordance with example implementations, the plurality of separate conductive meshes are spatially co-located at different locations in the semiconductor package corresponding to different components of the semiconductor package. The tampering corresponds to a given conductive mesh being associated with a given component. Performing the responsive action includes selecting the responsive action based on a policy that corresponds to the given component. A particular advantage is that the countermeasures that are employed may be specifically tailored to the importance or priority of the component(s) affected or targeted by the tampering.

In accordance with example implementations, generating the cryptographic security parameter includes comparing a difference of the second signal with the first signal to provide a difference signal and filtering the difference signal with a bandpass filter to provide a filtered signal. In accordance with example implementations, generating the cryptographic key further includes comparing, by a level detector, the filtered signal to a threshold to generate the signature. A particular advantage is that the generation of the cryptographic security parameter may be highly sensitive to permutations caused by physical tampering.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   energizing a first conductive mesh of a semiconductor package to provide a wireless transmission by providing a first signal to a first terminal of the first conductive mesh;
   capturing, by a second conductive mesh of the semiconductor package, a radiance produced by the wireless transmission to provide a second signal;
   determining a signature of the second signal;
   generating, by a cryptographic security parameter generator of the semiconductor package, a cryptographic security parameter based on the signature;
   receiving a third signal received from a second terminal of the first conductive mesh;
   responsive to the third signal, detecting physical tampering with the semiconductor package; and
   performing a responsive action responsive to the detection of the physical tampering.

2. The method of claim 1, wherein at least one of the first conductive mesh or the second conductive mesh comprises a conductive trace being routed in a pattern to induce signal reflections.

3. The method of claim 2, wherein the pattern comprises a Hilbert curve-based pattern.

4. The method of claim 1, wherein the cryptographic security parameter comprises a cryptographic key and the method further comprising at least one of:
   encrypting data based on the cryptographic key to provide encrypted data and storing the encrypted data in a non-volatile memory of the semiconductor package; or
   decrypting encrypted data stored in the non-volatile memory based on the cryptographic key.

5. The method of claim 1, wherein generating the cryptographic security parameter comprises generating the cryptographic security parameter responsive to a power up or a reset of the semiconductor package.

6. The method of claim 1, wherein the second conductive mesh is one of a plurality of separate conductive meshes, the method further comprising, for each mesh of the plurality of separate conductive meshes, capturing, by the mesh, a radiance from the wireless transmission to provide corresponding signals, wherein the corresponding signals comprise the second signal, and generating the cryptographic security parameter further comprises generating the cryptographic security parameter based on the corresponding signals.

7. The method of claim 6, wherein the plurality of separate conductive meshes are spatially co-located at different locations in the semiconductor package corresponding to different components of the semiconductor package.

8. The method of claim 1, wherein generating the cryptographic security parameter comprises generating a shared secret.

9. The method of claim 1, wherein the second conductive mesh is one of a plurality of separate conductive meshes, the method further comprising:
for each mesh of the plurality of separate conductive meshes, capturing, by the mesh, a radiance from the wireless transmission to provide corresponding signals, wherein the corresponding signals comprise the second signal,
generating a first fingerprint for each corresponding signal of the corresponding signals;
comparing the first fingerprints to respective expected second fingerprints; and
detecting tampering with the semiconductor package based on the comparison.

10. The method of claim 9, wherein:
the plurality of separate conductive meshes are spatially co-located at different locations in the semiconductor package corresponding to different components of the semiconductor package;
the tampering corresponds to a given conductive mesh of the plurality of conductive meshes associated with a given component of the different components; and
performing the responsive action comprises selecting the responsive action based on a policy corresponding to the given component.

11. The method of claim 1, further comprising performing a responsive action responsive to the detection of the tampering.

12. A method comprising:
energizing a first conductive mesh of a semiconductor package to provide a wireless transmission by providing a first signal to a first terminal of the first conductive mesh;
capturing, by a second conductive mesh of the semiconductor package, a radiance produced by the wireless transmission to provide a second signal;
determining a signature of the second signal; and
generating, by a cryptographic security parameter generator of the semiconductor package, a cryptographic security parameter based on the signature,
wherein generating the cryptographic security parameter comprises:
comparing the second signal to the first signal to provide a difference signal;
filtering the difference signal with a bandpass filter to provide a filtered signal; and
comparing, by a level detector, the filtered signal to a threshold to generate the signature.

13. A computer platform comprising:
a main processor to perform an operation based on a secret; and
a security co-processor coupled to the main processor, the security co-processor comprising:
a conductive mesh-based antenna comprising a terminal to provide a signal representing electromagnetic energy received by the antenna;
a non-volatile memory to store encrypted data corresponding to the secret;
a volatile memory;
a key generator to:
receive a fingerprint corresponding to the signal;
generate a cryptographic key based on the fingerprint; and
store data representing the cryptographic key in the volatile memory; and
a second processor to access the encrypted data using the cryptographic key.

14. The computer platform of claim 13, wherein the key generator comprises a deterministic random bit generator to generate the cryptographic key based on the fingerprint.

15. The computer platform of claim 13, further comprising a fingerprint generator to time division sample the signal to provide samples of the signal, wherein the samples represent the fingerprint.

16. The computer platform of claim 13, wherein the signal comprises a radio frequency (RF) carrier that has a plurality of frequencies over time, the security co-processor further comprising:
a fingerprint generator to:
perform frequency-based sampling of the signal to provide samples; and
generate the cryptographic key based on the samples.

17. An apparatus comprising:
a semiconductor die comprising a first metal layer and a second metal layer other than the first metal layer, wherein the first metal layer comprises a mesh, a first radio frequency (RF) signal to be provided to the mesh to cause a wireless RF energy transmission to propagate from the mesh, and the second metal layer comprises a mesh-based antenna to capture a radiance from the wireless RF energy transmission to provide a second signal responsive to the RF energy; and
a non-volatile memory to store encrypted data corresponding to a security parameter;
a processor to access the encrypted data using the cryptographic key;
a converter coupled to the mesh-based antenna to receive the second signal and provide a fingerprint responsive to the second signal; and
a key generator to generate the cryptographic key based on the fingerprint.

18. The apparatus of claim 17, further comprising a baseboard management controller, wherein the baseboard management controller comprises a security subsystem, and the security subsystem comprises the semiconductor die, the non-volatile memory, the processor, the converter and the key generator.

19. The apparatus of claim 17, further comprising a trusted platform module, wherein the trusted platform module comprises the semiconductor die, the non-volatile memory, the processor, the converter and the key generator.

* * * * *